US007523176B2

(12) United States Patent
Eisenhauer et al.

(10) Patent No.: US 7,523,176 B2
(45) Date of Patent: Apr. 21, 2009

(54) METHOD, APPARATUS, AND COMPUTER PROGRAM PRODUCT FOR RECONFIGURING A STORAGE AREA NETWORK TO SUPPORT THE EXECUTION OF AN APPLICATION AUTOMATICALLY UPON EXECUTION OF THE APPLICATION

(75) Inventors: Daniel G. Eisenhauer, Austin, TX (US); Giles Roger Frazier, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 553 days.

(21) Appl. No.: 11/195,020

(22) Filed: Aug. 2, 2005

(65) Prior Publication Data

US 2007/0033366 A1 Feb. 8, 2007

(51) Int. Cl.
*G06F 15/177* (2006.01)
*G06F 15/16* (2006.01)
*G06F 12/00* (2006.01)

(52) U.S. Cl. .................. 709/220; 709/228; 711/170

(58) Field of Classification Search ................ 709/220, 709/221, 222, 228; 711/170; 712/228, 229
See application file for complete search history.

(56) References Cited

U.S. PATENT DOCUMENTS

| 6,571,258 | B1 | 5/2003 | Borowsky et al. | |
|---|---|---|---|---|
| 6,681,323 | B1 * | 1/2004 | Fontanesi et al. | ............... 713/1 |
| 6,839,746 | B1 * | 1/2005 | Muthiyan et al. | ............ 709/220 |
| 7,349,961 | B2 * | 3/2008 | Yamamoto | .................. 709/224 |
| 7,356,573 | B2 * | 4/2008 | Sharma et al. | ............... 709/218 |
| 2002/0059263 | A1 | 5/2002 | Shima et al. | |
| 2003/0200473 | A1 | 10/2003 | Fung | |
| 2004/0078599 | A1 * | 4/2004 | Nahum | ........................ 713/201 |
| 2004/0083308 | A1 | 4/2004 | Sebastian et al. | |
| 2004/0243699 | A1 | 12/2004 | Koclanes et al. | |
| 2004/0260899 | A1 | 12/2004 | Kern et al. | |
| 2006/0080318 | A1 * | 4/2006 | Huston et al. | .................. 707/10 |

FOREIGN PATENT DOCUMENTS

| JP | 2000148413 A | 5/2000 |
|---|---|---|
| JP | 2001290680 A | 10/2001 |

OTHER PUBLICATIONS

U.S. Appl. No. 10/973,310, filed Oct. 26, 2004, Nagin et al.
U.S. Appl. No. 09/870,916, filed May 31, 2001, Abboud et al.
Mattson et al., "Automatic Reconfiguration of Disk Arrays", Research Disclosure, No. 343, Kenneth Mason Publications Ltd., England, Nov. 1992, 1 page.
IBM Technical Disclosure Bulletin "Automatic Reconfiguration Facility Enhancements", vol. 36, No. 10, Oct. 1993, pp. 123-124.

* cited by examiner

*Primary Examiner*—Ario Etienne
*Assistant Examiner*—Ho Shiu
(74) *Attorney, Agent, or Firm*—Yee & Associates, P.C.; Matthew W. Baca

(57) ABSTRACT

A method, apparatus, and computer program product are disclosed for reconfiguring a storage area network (SAN) to support the execution of an application automatically upon execution of the application. A data set is generated for the application that identifies types of SAN devices that are necessary in order for the SAN to support the execution of the application. An execution of the application is initiated. A SAN manager then utilizes the data set to configure the SAN to support the execution of the application by selecting particular ones of the identified types of SAN devices to use to support the execution. The application is then executed utilizing the selected SAN devices.

1 Claim, 4 Drawing Sheets

METHOD, APPARATUS, AND COMPUTER PROGRAM PRODUCT FOR RECONFIGURING A STORAGE AREA NETWORK TO SUPPORT THE EXECUTION OF AN APPLICATION AUTOMATICALLY UPON EXECUTION OF THE APPLICATION

BACKGROUND OF THE INVENTION

1. Field of the Invention

The present invention relates generally to data processing systems. More specifically, the present invention is directed to a method, apparatus, and computer program product for reconfiguring a storage area network (SAN) to support the execution of an application automatically upon execution of the application.

2. Description of the Related Art

A storage area network (SAN) is a dedicated network that serves to interconnect storage-related resources available to one or more networked servers. A SAN is typically separate from local area networks (LANs) and wide area networks (WANs). SANs are often characterized by high interconnection data rates between member storage peripherals. SANs are also often characterized by highly scalable architectures. SANs include both hardware and software for hardware management, monitoring, and configuration.

In order for the SAN to support the execution, by a host processor, of a particular application, a user must configure the SAN. The user is required to select particular devices that will be used and then configure those devices so that they will support the execution of the application. The SAN is manually configured by the user to support the execution of a particular application when the user performs one or more of the following actions: creates or modifies one or more SAN zones, assigns one or more Logical Units (LUNs) to a particular host port, assigns host ports and/or target ports to a zone, adjusts the bandwidths of inter-switch communication paths, and adjusts other SAN parameters as needed.

After the application has completed executing, a user might manually reconfigure the SAN in order to support the execution of a different application. The SAN configuration, at this time, might no longer support the execution of the first application. If the user then decided to execute the first application again, the SAN would need to be reconfigured to again support the execution of the first application. At this time, the user would need to manually reconfigure the SAN to support the execution of the first application. Requiring the user to continue to manually reconfigure the SAN places extensive demands on the user and increases the likelihood that mistakes may be made by the user.

If the first application were executed again at a later time, the SAN configuration might still support the execution of the first application. In this case, the SAN would not need to be reconfigured. However, the user is required to execute the application using the same processing environment, i.e., the same host processor(s), the same host bus adapters (HBAs), the same target bus adapters (TBAs), the same routes through the SAN, and any other resources used the first time. This requirement limits the user to a particular processing environment that might no longer be the optimal or preferred processing environment.

This is not a practical solution. The original host processor may be busy now performing other processes or may be unavailable for other reasons. When the host processor is already busy or unavailable, it is necessary to choose a different host processor to use to execute the application which would result in requiring the user to manually reconfigure the SAN.

A SAN may be configured by creating, modifying, or removing zones. A zone is a logical grouping of some or all of the hosts and/or resources in the SAN. A SAN may be concurrently logically divided into several different zones with each zone including different logical groupings of hosts and resources. Zoning a SAN has a number of benefits including load balancing, dedication of storage capacity, data integrity, and security, as well as others.

Zones contain Fibre Channel ports. When a zone is created, various hosts and resources are assigned to that zone by including the host's or resource's port in the zone. Host and resources that are assigned to the zone are allowed to access only the other hosts and resources that are assigned to the same zone. The hosts and resources in one zone are not allowed to access hosts and resources in other zones unless they are also in the other zone.

Each host and resource in a SAN includes a port that couples the host or resource to the SAN. The zoning is enforced by making a port, whether it is a target adapter or host adapter port, in a zone visible to only those other ports that are part of the same zone.

A SAN may also be configured by subdividing storage devices in the SAN into Logical Units (LUNs) where the devices may also support LUN masking. LUN masking is a capability of a storage device to assign a set of its LUNs to a particular set of host ports. Other LUNs may also exist in the same storage device, where these other LUNs are assigned to a different set of host ports. The storage device then restricts access to the LUNs such that each LUN can only be accessed from the particular set of host ports to which it is assigned. When the host controlling that host port restricts usage of the host port to a particular operating system, the LUNs that the storage device assigns to the host port become accessible only to that particular operating system in the host.

As described above, when a particular user application is first executed, the user selects a particular host processor on which to execute the application, and the user selects a particular host port on the processor for use by the application. This host processor port may be assigned to a particular zone that includes particular I/O devices, including those I/O devices needed to support the application. When this application is executed, data will typically be stored on one or more of these I/O devices for the application. Because the host processor port is included within a zone that includes the I/O devices needed by the application, the host processor is able to access the I/O devices and store the application's data.

When the application is executed at a later time, the user might choose to execute the application on a different, second host processor and a different port. The port of this second host processor may be included within a zone or zones that are different from the zone of the first host processor port. These zones contain different I/O adapter ports. Thus, when the application is executed by the second host processor, the second host processor may not have access to the I/O adapters that were used by the first host processor to store the application's data. Therefore, the application will not have access to its data.

In order to always be able to access the data that was stored on the I/O adapters, existing solutions require either manual reconfiguration of the SAN prior to execution of the application or require the application to always be run on the same processor and using the same SAN devices. Neither solution is acceptable because of the extensive demands placed on the user and the likelihood that mistakes could be made by the user and the processing limitations.

Therefore, a need exists for a method, apparatus, and computer program product for automatically reconfiguring a SAN's zoning, LUN masking, and other parameters to create a SAN configuration which supports the application in response to a request to execute the application.

SUMMARY OF THE INVENTION

A method, apparatus, and computer program product are disclosed for reconfiguring a storage area network (SAN) to support the execution of an application automatically upon execution of the application. A data set is generated for the application that identifies SAN devices and other SAN parameters that are necessary in order for the SAN to support the execution of the application. An execution of the application is initiated. A SAN manager then utilizes the data set to configure the SAN to support the execution of the application by selecting particular ones of the identified types of SAN devices to use to support the execution and configuring other SAN parameters as needed. The application is then executed utilizing the selected SAN devices.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
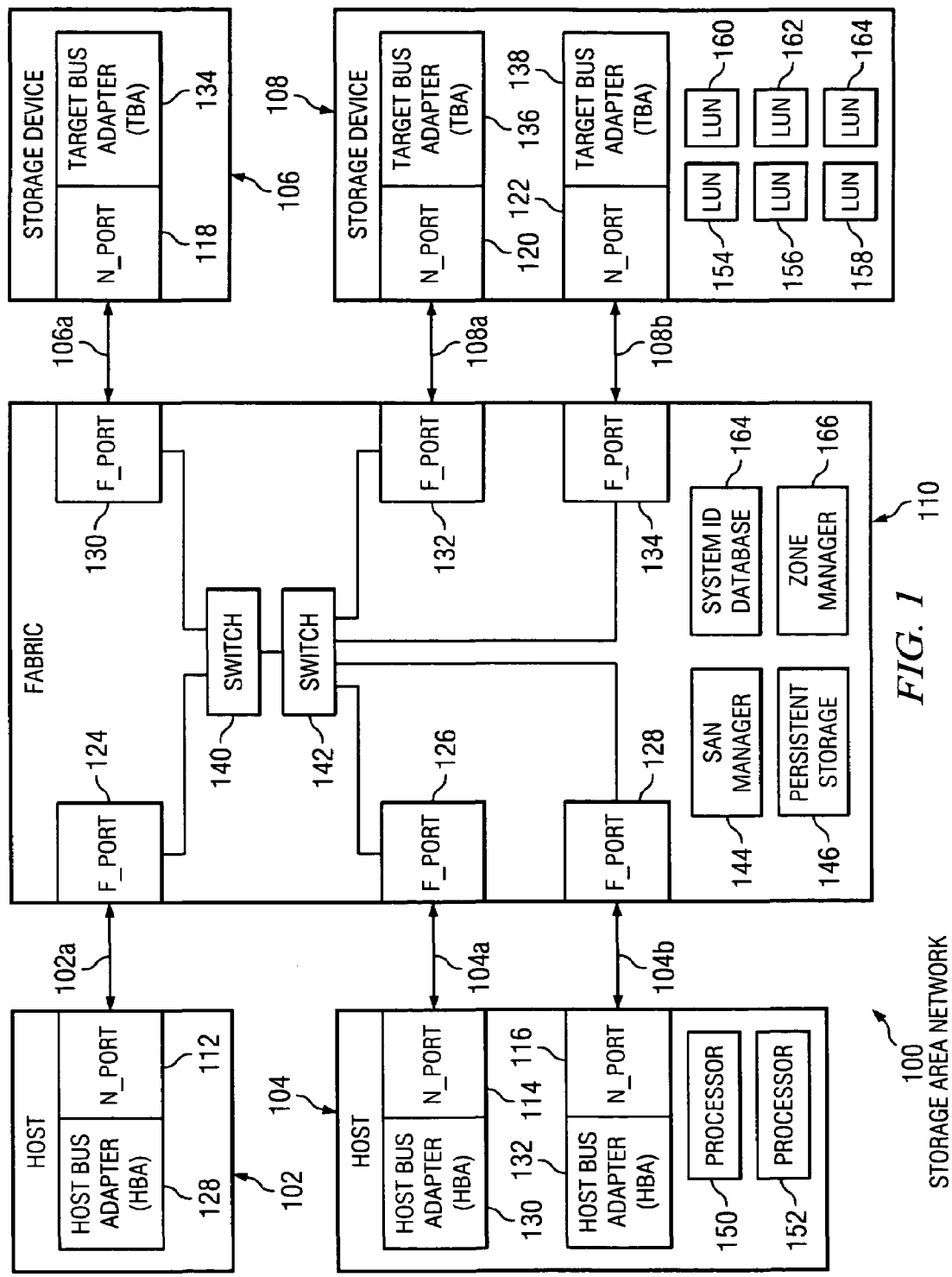
FIG. 1 is a block diagram of a storage area network that includes multiple nodes that are coupled together utilizing a fabric in accordance with the present invention.

The present invention is a method, apparatus, and computer program product for reconfiguring a storage area network (SAN) to support the execution of an application automatically upon execution of the application. A data set is generated for the application when the application is initially installed. This data set defines the types and quantities of SAN devices that will be necessary in order to permit the SAN to support the execution of the application. The data set will also include an identification of physical or virtual devices if specific physical or virtual devices are necessary.

The data set is saved in persistent storage and later retrieved any time the application is about to be executed. When the application is about to be executed, the SAN manager retrieves that application's data set and uses it to select devices of the types and quantities identified in the data set. If particular devices are identified in the data set, they are selected as well. These selected devices are then configured so that the SAN will support the execution of the application.

The data set is automatically retrieved without any user intervention when the application is to be executed. The SAN is also automatically configured to support the execution of the application without any user intervention. When the application has stopped executing, the SAN is reconfigured back to its original state without user intervention.

The data set can be generated either manually or automatically. If it is generated manually, then it needs to be generated only once when the application is first executed. It can also be generated automatically without any user intervention if the application is configured to notify the SAN manager, when the application is first executed, about the resources it needs, such as its special computing resource requirements, HBAs, TBAs, LUNs, etc., in order for the SAN to support the execution of the application.

The present invention configures the SAN by creating and configuring a new zone for the application's use, if needed, modifying the LUN masks maintained at the storage devices, if needed, and adjusting other SAN parameters (e.g. Fabric bandwidths) to create an environment suitable for executing the application. The application is then executed. The application is thereby permitted to access its data in specific storage devices and LUNs.

Once the application has finished executing, the SAN is restored to its original state by removing any zone created to support the application, removing any modifications to LUN masks, and undoing any special adjustments that were made to SAN parameters to support the application. When the SAN is restored to its original state, the storage device HBAs may become parts of other, different zones, and the modifications to the LUN masks maintained by the storage devices in support of the application are removed.

When the application is executed again, regardless of whether that application is executed on the same host processor or a different host processor, the SAN will once again need to be configured to support the execution of the application. This means that the zoning of the SAN, the LUNs, and other SAN parameters may again be modified. A new zone may be created that will include the storage device HBAs that the application needs to access, and LUN masks are again modified to support the application. This second new zone will include the host processor HBA which the application is now using. This second host processor will have access to the application's storage devices and LUNs.

The first time an application is executed it will be executed on a first host processor which uses a first HBA. If necessary, a first zone is created or an existing zone is modified to include this first host processor's HBA and particular storage device's HBA. The LUN masks maintained by the storage device are also modified to allow the host adapter's HBA to access the LUNs needed by the application. This first host processor and its HBA then have access to the particular storage devices and LUNs. The application's data is then stored on these storage devices and LUNs. When the application stops executing, the SAN is restored to its original configuration, such as by removing the first zone (if it was created above) and undoing any modifications to the LUN masks.

The next time the application is executed, it may be executed on a second, different host processor which uses a different, second HBA. This time when the application is executed, a second zone may be created or modified. This second zone will include the second host processor's HBA.

The particular storage device HBAs are also included in this second zone, and the LUN masks maintained by the particular storage device are modified so that the second host processor and its second HBA now have access to these same particular storage devices and LUNs. In this manner, the application will always have access to its data regardless of which host processor and/or HBA is used to execute the application.

In addition to creating a new zone and modifying LUN masks, the present invention also may adjust the SAN parameters such as Fabric bandwidths so that communication between the application and its data is performed at an adequate performance level.

The present invention may select SAN devices to use to support the execution of the application based on the current state of the SAN and the current utilization of the devices. For example, when an application can use one of several different HBAs, the present invention might select the most currently underutilized HBA. The present invention is thus capable of maximizing the performance of the SAN for the execution of the application.

The application is executed within a logical partition in a host. In order to execute the application in a different host, the logical partition is migrated from the first host to the different host. According to the present invention, the logical partition, in which the application is executing, can be migrated from one host to another. The present invention then configures the SAN to support the migration. The SAN is automatically configured, as described herein, without user intervention so that the logical partition can be executed on the different host.

Prior to describing the present invention in detail, the background of a computing environment that includes the present invention is described with reference to FIGS. 1 and 2.

FIG. 1 is a block diagram of a storage area network that includes multiple nodes that are coupled together utilizing a fabric in accordance with the present invention. FIG. 1 depicts a storage area network (SAN) 100 in accordance with the present invention. SAN 100 includes multiple end nodes, such as host 102, host 104, storage device 106, and storage device 108.

SAN 100 is a Fibre Channel network. Fibre Channel is a protocol suite for transfer of data within a SAN. Fibre Channel is an architecture developed by a consortium of computer and mass storage device manufactures currently being standardized by the American National Standards Institute (ANSI). Fibre Channel was designed for mass storage devices and other peripheral devices that require very high bandwidth. Using optical fiber to connect devices, Fibre Channel supports high data transfer rates. Additional information about Fibre Channel can be found in the Fibre Channel specification, which is ANSI document number ANSI/INCITS 373 entitled *Information Technology-Fibre Channel Framing and Signaling Interface (FC FS)*.

Each end node is coupled to fabric 110 utilizing at least one Fibre Channel link. For example, host 102 is coupled to fabric 110 utilizing link 102a. Host 104 is coupled to fabric 110 utilizing links 104a and 104b; storage device 106 is coupled to fabric 110 utilizing link 106a; and storage device 108 is coupled to fabric 110 utilizing links 108a and 108b.

Each node is coupled to its Fibre Channel link through a Fibre Channel port, i.e. an N_Port, included in the node. Node 102 includes N_Port 112. Node 104 includes N_Ports 114 and 116. Node 106 includes N_Port 118. Node 108 includes N_Ports 120 and 122.

As depicted, nodes 102 and 104 are hosts, and nodes 106 and 108 are storage devices.

Fabric 110 includes a Fibre Channel port, i.e. an F_Port, for each node. Thus, a node is coupled to the fabric by coupling an N_Port in the node to an F_Port in the fabric utilizing a Fibre Channel communications link.

N_Port 112 in node 102 is coupled to F_Port 124 in fabric 110 utilizing Fibre Channel communications link 102a. N_Port 114 in node 104 is coupled to F_Port 126 in fabric 110 utilizing Fibre Channel communications link 104a. N_Port 116 in node 104 is coupled to F_Port 128 in fabric 110 utilizing Fibre Channel communications link 104b. N_Port 118 in node 106 is coupled to F_Port 130 in fabric 110 utilizing Fibre Channel communications link 106a. N_Port 120 in node 108 is coupled to F_Port 132 in fabric 110 utilizing Fibre Channel communications link 108a. N_Port 122 in node 108 is coupled to F_Port 134 in fabric 110 utilizing Fibre Channel communications link 108b.

Each host includes at least one Host Bus Adapter (HBA). Host 102 includes HBA 128 which communicates with fabric 110 through N_Port 112, communications link 102a, and F_Port 124.

Host 104 includes HBA 130 which communicates with fabric 110 through N_Port 114, communications link 104a, and F_Port 126. Host 104 also includes HBA 132 which communicates with fabric 110 through N_Port 116, communications link 104b, and F_Port 128.

Each storage device includes at least one Target Bus Adapter (TBA). When a storage device includes more than one TBA, the storage device can use any of its TBAs to communicate with the fabric. For example, storage device 106 includes TBA 134 which communicates with fabric 110 through N_Port 118, communications link 106a, and F_Port 130.

Storage device 108 includes TBA 136 which communicates with fabric 110 through N_Port 120, communications link 108a, and F_Port 132. Storage device 108 also includes TBA 138 which communicates with fabric 110 through N_Port 122, communications link 108b, and F_Port 134.

Fabric 110 includes one or more switches, such as switches 140 and 142, for switching network packets through fabric 110.

Fabric 110 includes a SAN manager 144 which is responsible for configuring and managing the various ports, switches, and other devices in the fabric 110. SAN manager 144 is also responsible for managing the zoning of the SAN. Alternatively, a zone manager 166 may be used to manage the zoning of the SAN.

Each host includes one or more processors. For example, host 104 includes processor 150 and processor 152. Each processor is capable of communicating with fabric 110 through any one of the HBAs in the processor's host. In addition, one HBA may be used concurrently by more than one processor for communication with the fabric.

For example, processor 150 can communicate with fabric 110 using either HBA 130 or HBA 132. Similarly, processor 152 can communicate with fabric 110 using either HBA 130 or HBA 132. The host will select one of the HBAs to be used by a processor to communicate with fabric 110. Any criteria may be used to make the selection, such as whether the particular HBA is available or already assigned to another processor.

Either just part of a storage device or the entire storage device may be logically divided into multiple LUNs. For example, storage device 108 has been divided into LUNs 154, 156, 158, 160, 162, and 164.

When an application is first installed, the application is assigned a unique system identifier (ID). The association between the application and its system ID is maintained within a system ID database 164 in fabric 110.

To establish Fibre Channel connectivity, a port on either an HBA or a TBA is required. The port is referred to as an N_Port. For example, HBA 130 contains N_Port 114 and TBA 136 contains N_Port 120.

N_Port ID Virtualization (NPIV) provides a Fibre Channel facility that enables a single physical HBA to support multiple "virtual" ports, where each virtual port appears to the fabric as if it were a physical N_Port.

A zone is a logical grouping of ports. When a zone is defined, the ports within that zone are identified. The ports identified within a zone are associated with that zone. Both host ports and target ports can be identified as members of a zone.

A zone manager 166 is included that is responsible for maintaining the information for each defined zone as well as for defining new zones and removing zones. The zone manager maintains a zoning database that includes the identification of each port in each zone. In the zoning database, each port is identified by its port name. A zone identifier (ID) is associated with each zone.

A port can be removed from a zone. Removing a port from a zone disassociates that port from other ports that are included in the zone. Ports can be associated with multiple zones at the same time.

A determination may be made as to the zone within which a particular host bus adapter port is included. The zone manager receives a query that includes the particular host bus adapter ID. The zone manager then searches the zoning database using the host bus adapter ID. The zone manager then locates the entry for the host bus adapter ID and determines the zone ID that is associated with the host bus adapter ID. The zone manager then returns a query response that includes the host bus adapter ID and the zone ID for the zone in which this host bus adapter is included.

The targets that are included within that particular zone can be determined by submitting the host bus adapter ID to the zone manager. The zone manager receives the host bus adapter ID and then searches the targets database. Each target that is associated with that host bus adapter is identified. The zone manager then returns a query response that includes the host bus adapter ID and the IDs for each identified target bus adapter.

Figure 2:
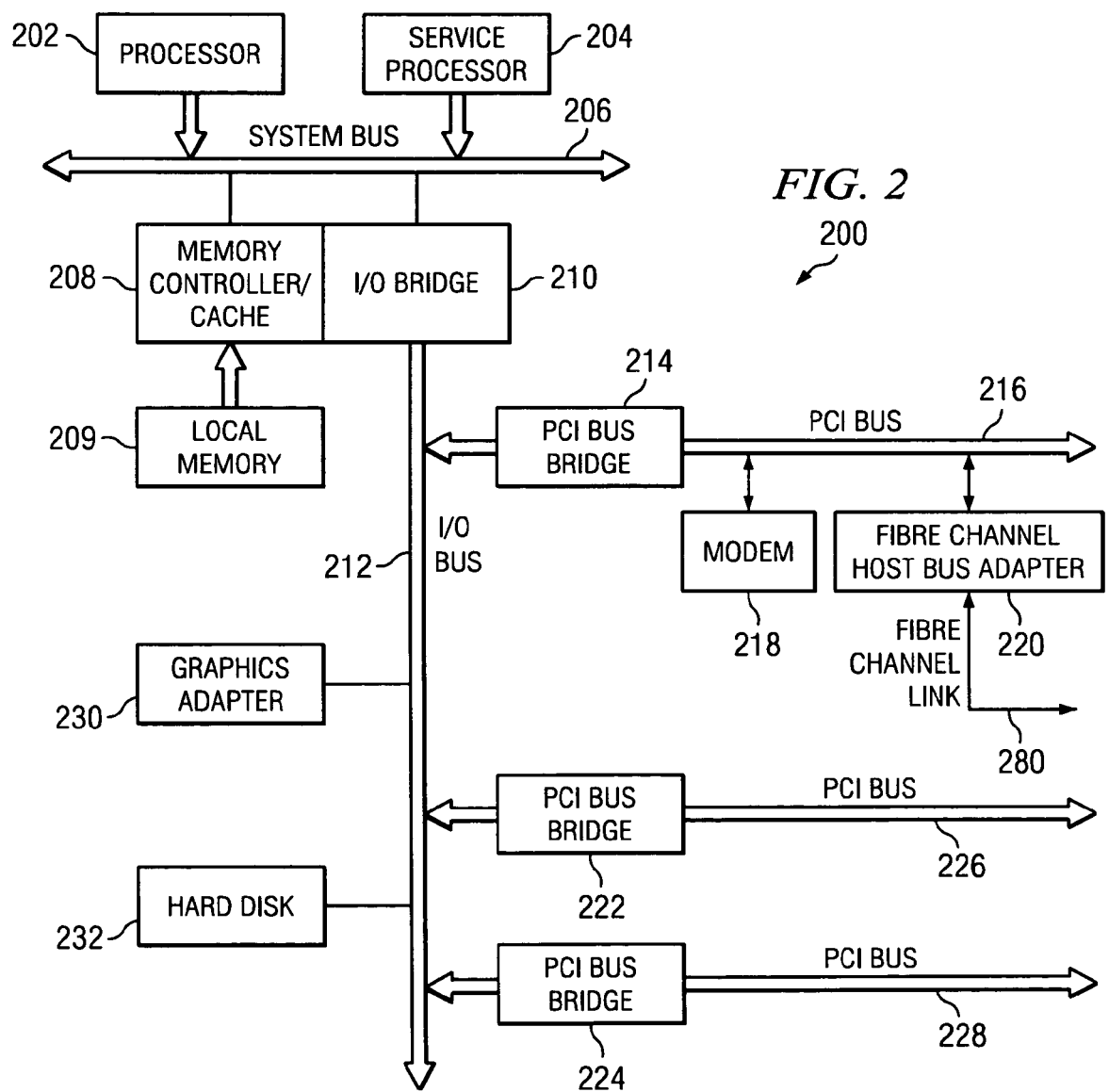
FIG. 2 is a block diagram of a data processing system that may be used to implement any of the data processing systems of FIG. 1 in accordance with the present invention.

FIG. 2 is a block diagram of a data processing system that may be used to implement any of the data processing systems of FIG. 1 in accordance with the present invention. Data processing system 200 may be a symmetric multiprocessor (SMP) system including a plurality of processors 202 and 204 connected to system bus 206. Alternatively, a single processor system may be employed. In the depicted example, processor 204 is a service processor. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of I/O adapters, such as modem 218 may be connected to PCI bus 216. Typical PCI bus implementations will support four PCI expansion slots or add-in connectors. Communications links to other computers may be provided through modem 218 and Fibre channel host bus adapter 220. Host Bus Adapter (HBA) 220 enables data processing system 200 to send and receive messages from fabric 110 via a Fibre Channel link 280.

Additional PCI bus bridges 222 and 224 provide interfaces for additional PCI buses 226 and 228, from which additional modems or network adapters may be supported. In this manner, data processing system 200 allows connections to multiple network computers.

A memory-mapped graphics adapter 230 and hard disk 232 may also be connected to I/O bus 212 as depicted, either directly or indirectly.

Figure 3:
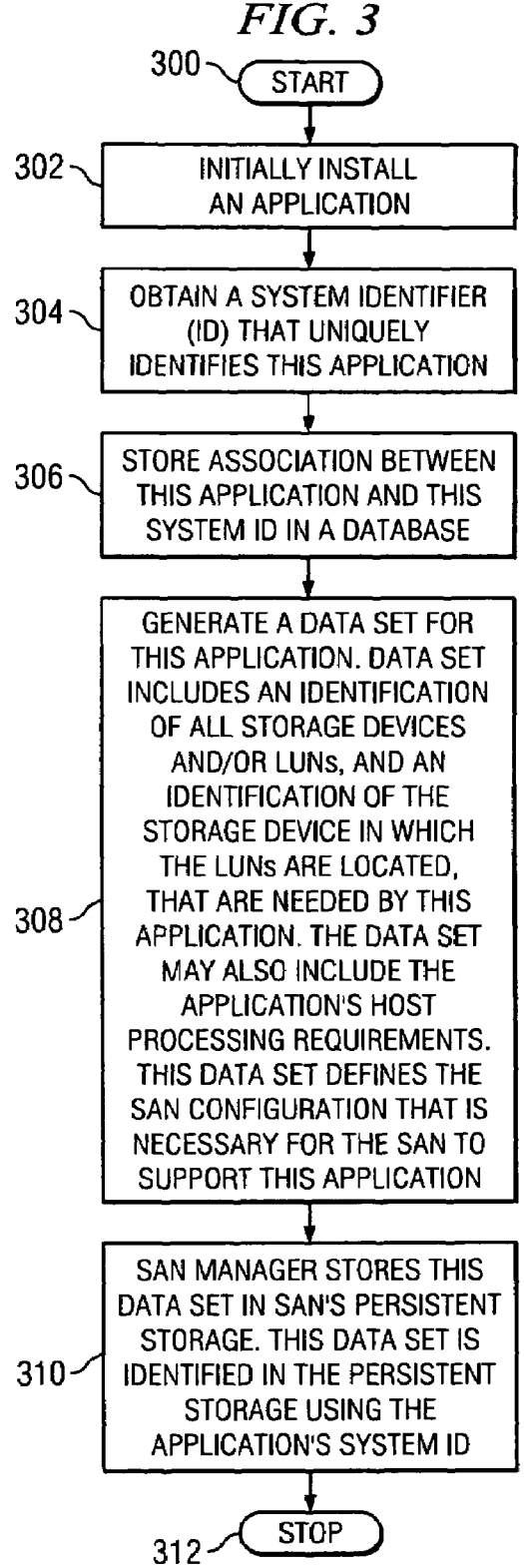
FIG. 3 depicts a high level flow chart that illustrates generating a data set that defines the necessary SAN configuration that is needed to execute an application in accordance with the present invention.

FIG. 3 depicts a high level flow chart that illustrates generating a data set that defines the necessary SAN configuration that is needed to execute an application in accordance with the present invention. The process starts as depicted by block 300 and thereafter passes to block 302 which illustrates initially installing an application on a host.

Next, block 304 depicts obtaining a system identifier (ID) that uniquely identifies this application. The system ID is a non-volatile unique identifier that corresponds to a particular application. In order to make each system ID unique throughout the entire SAN, the format could be defined by a standards body. Any format could be used for a system ID to ensure uniqueness. A typical standard format would include a "company identifier" that identifies the organization or company that owns the system ID followed by a number of digits chosen by the owning organization. An index that lists such standards bodies can be found at http://standards.ieee.org/regauth/index.html. In addition, the Fibre Channel specification referenced above includes examples of unique identifiers that include company identifiers.

The process then passes to block 306 which illustrates storing the association between this application and its unique system ID in a database. The database may be located anywhere throughout the SAN. In the example depicted in FIG. 1, the database 164 is located in the fabric 110.

Next, block 308 depicts generating a data set for this application. The data set includes an identification of all storage devices and all LUNs needed by this application. The identification of a LUN includes within it an identification of the storage device in which that LUN is located. The data set may also include the application's host processing requirements. An application's host processing requirements may include the required host processing capability (e.g., necessary hardware accelerators and/or required MIPS), fabric bandwidth, latency, and/or error tolerance. This data set defines the SAN configuration that is necessary for the SAN to support this application. The data set also includes information that can be used to optimize the SAN to support the execution of the application.

Block 310, then, depicts the SAN manager storing this data set in the SAN's persistent storage. As depicted in FIG. 1, it is stored in persistent storage 146. This data set is identified and indexed in the persistent storage using the application's system ID. The process then terminates as illustrated by block 312.

Figure 4:
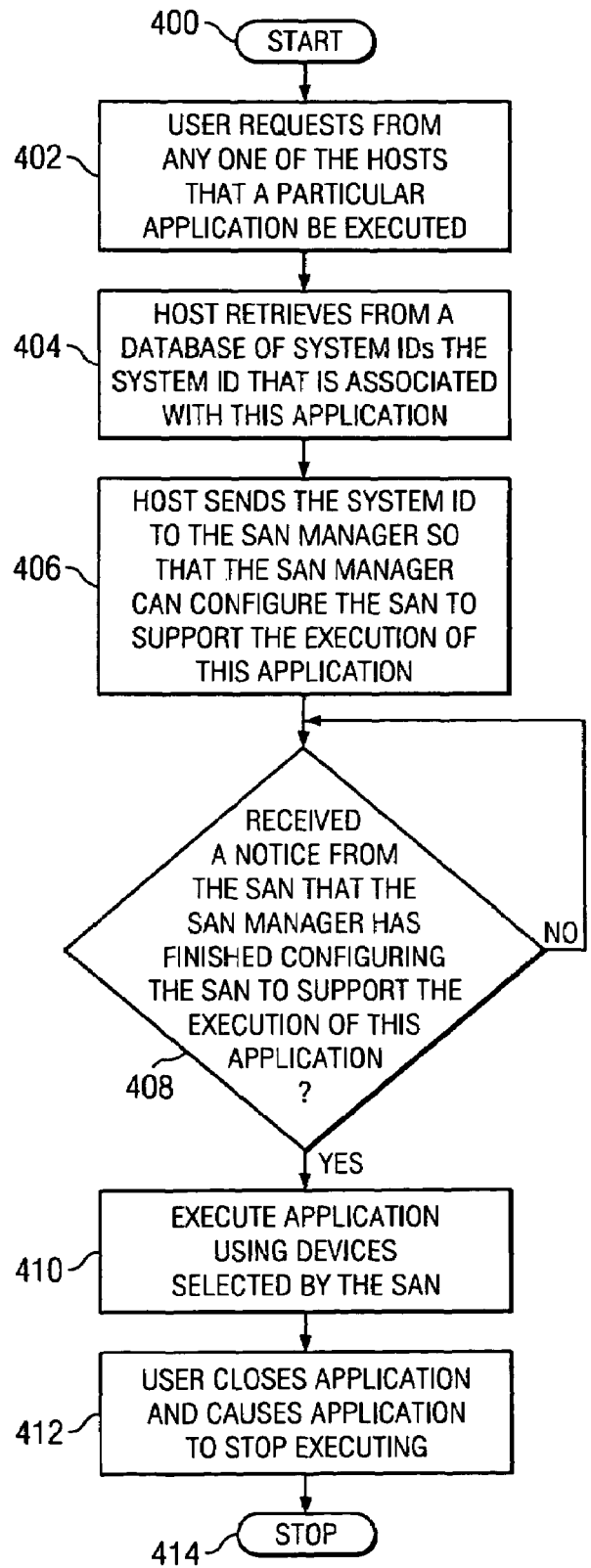
FIG. 4 illustrates a high level flow chart that depicts executing an application from one of the hosts in a SAN in accordance with the present invention.

FIG. 4 illustrates a high level flow chart that depicts executing an application from one of the hosts in a SAN in accordance with the present invention. The process starts as depicted by block 400 and thereafter passes to block 402 which illustrates a user requesting from any one of the SAN's hosts that a particular application be executed. The request to execute the application may come from a console (not shown) or service and need not be generated from one of the hosts of the SAN.

Next, block 404 depicts the host retrieving from a database of system IDs the unique system ID that is associated with this particular application. Block 406, then, illustrates the host sending the system ID to the SAN manager so that the SAN manager can configure the SAN to support the execution of this application. Thereafter, block 408 depicts a determination of whether or not a notice has been received from the SAN that the SAN manager has finished configuring the SAN to support the execution of this application. If a determination is made that a notice has not been received from the SAN manager that the SAN has been configured to support the execution of this application, the process passes back to block 408. If a determination is made that a notice has been received that indicates that the SAN has been configured to support the execution of this application, the process passes to block 410.

Block 410, then, depicts executing the application using the devices, such as the host and HBA, that were selected by the SAN for processing the application. Next, block 412 illustrates the user closing the application and causing the application to stop executing. The process then terminates as depicted by block 414.

Figure 5:
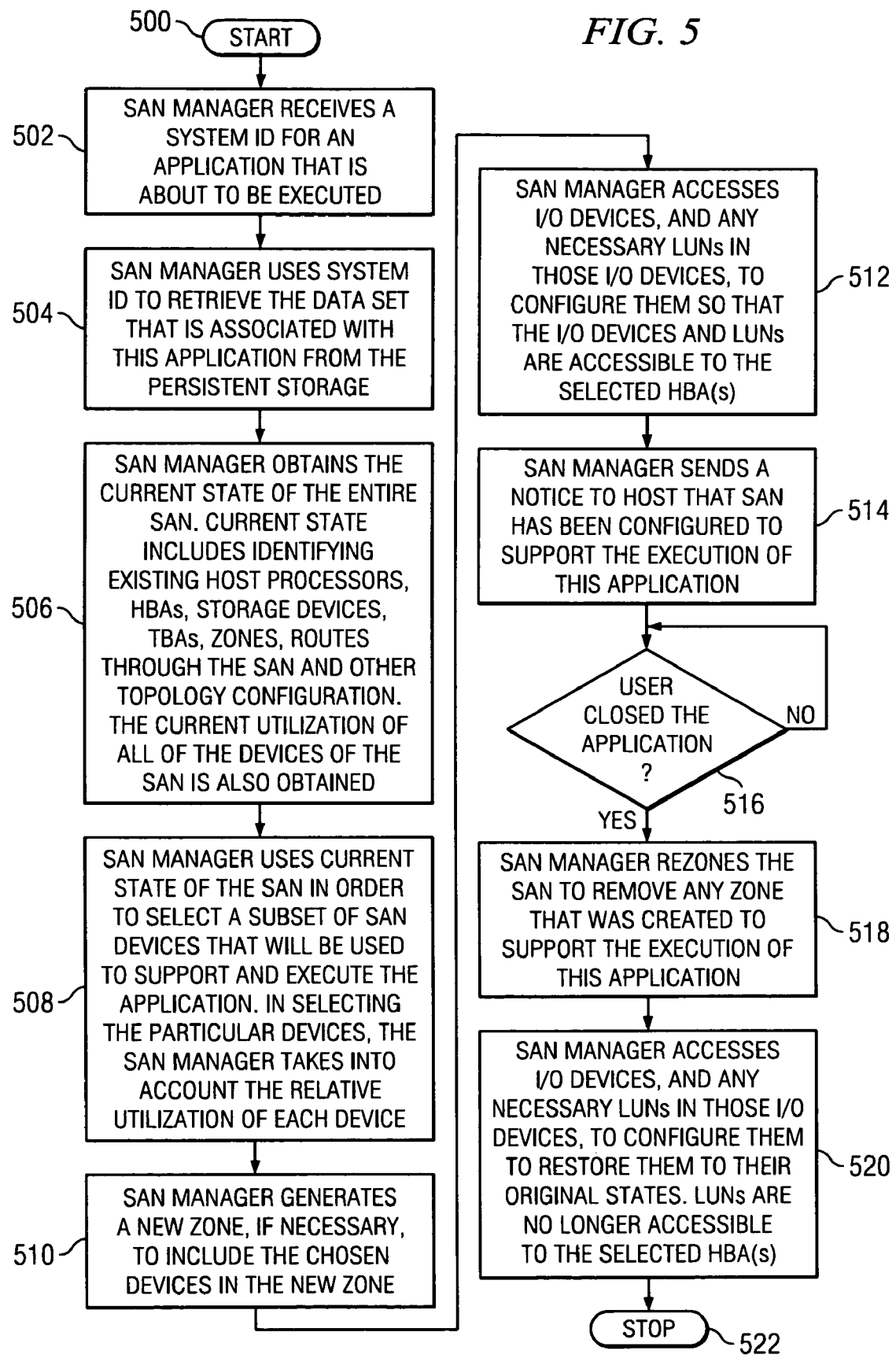
FIG. 5 depicts a high level flow chart that illustrates automatically reconfiguring a SAN to support the execution of an application automatically upon the execution of the application in accordance with the present invention.

FIG. 5 depicts a high level flow chart that illustrates automatically reconfiguring a SAN to support the execution of an application automatically upon the execution of the application in accordance with the present invention. The process starts as depicted by 500 and thereafter passes to block 502 which illustrates the SAN manager receiving a system ID for an application that is about to be executed. Next, block 504 depicts the SAN manager using the system ID to retrieve from persistent storage the data set that is associated with this application.

The process then passes to block 506 which illustrates the SAN manager obtaining the current state of the entire SAN. The entire SAN is evaluated. The current state includes identifying existing host processors, HBAs, storage devices, TBAs, zones, routes through the SAN, and other configuration information that describes the topology of the SAN. The current utilization of all of the various devices that make up the SAN, including host processors, HBAs, storage devices, TBAs, and routes through the SAN, is also obtained.

Next, block 508 depicts the SAN manager evaluating the current state of the SAN in order to select a subset of SAN devices that will be used to support and execute the application. Thus, the SAN manager evaluates the current state of the SAN in order to select a particular host processor, HBA, one or more storage devices, a TBA, and the route through the SAN which it will use to support the application. The SAN also selects specific devices, such as specific LUNs, that are identified in the data set. In this manner, the SAN manager selects a part of the SAN to use to support the application.

In selecting the particular devices, the SAN manager takes into account the relative utilization of each device. For example, if the application can use either HBA 128 or 132 to access the LUNs needed by the application and HBA 128 is 90% utilized while HBA 132 is only 10% utilized, the SAN manager will select HBA 132.

The process then passes to block 510 which illustrates the SAN manager generating a new zone, if necessary, that includes the chosen devices in the new zone. Thereafter, block 512 depicts the SAN manager accessing the I/O devices, and any necessary LUNs in those I/O devices, to configure them so that the I/O devices and LUNs are accessible to the selected HBA(s). Therefore, the SAN manager will access the selected I/O device(s) in order to cause the I/O device(s) to configure the LUNs in the I/O device(s) so that the LUNs can be accessed by the selected HBA(s).

Next, block 514 depicts the SAN manager sending a notice to the host that is attempting to execute the application that the SAN has been configured to support the execution of this application. Thereafter, block 516 illustrates a determination of whether or not the user has closed the application and the application has stopped executing. If a determination is made that the user has not closed the application, the process passes back to block 516. If a determination is made that the user has closed the application, the process passes to block 518 which depicts the SAN manager rezoning the SAN to remove any zone that was created in order to support the execution of the application.

Thereafter, block 518 illustrates the SAN manager accessing I/O devices, and any necessary LUNs in those I/O devices, to reconfigure them to restore them to their original state. Thus, the SAN manager will access the selected I/O device(s) in order to cause the I/O device(s) to configure the LUNs in the I/O device(s) so that the LUNs can no longer be accessed by the selected HBA(s). The process then terminates as depicted by block 522.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for reconfiguring a storage area network to support execution of an application automatically upon the execution of the application, the computer implemented method comprising:

receiving a unique system identifier for the application to be executed in a particular host processor in the storage area network, wherein the unique system identifier is associated with the application and uniquely identifies a data set associated with the application, wherein the data set identifies storage area network devices, logical units, and storage area network parameters that are necessary to support the execution of the application;

retrieving the data set from a persistent storage using the unique system identifier;

examining a current state of the storage area network to determine a current utilization of the storage area network devices;

selecting a particular host processor and the storage area network devices identified in the data set to form selected storage area network devices based on the current utilization, to facilitate execution of the application and to optimize the storage area network performance during the execution of the application;

configuring a new zone in the storage area network using the selected storage area network devices to support the automatic execution of the application;

notifying the particular host processor of the new zone for executing the application;

executing the application using the selected storage area network devices in the new zone; and responsive to determining that a user has closed the application and has completed execution of the application, removing the new zone and restoring a previous zone in the storage area network.

* * * * *